Figure 1:
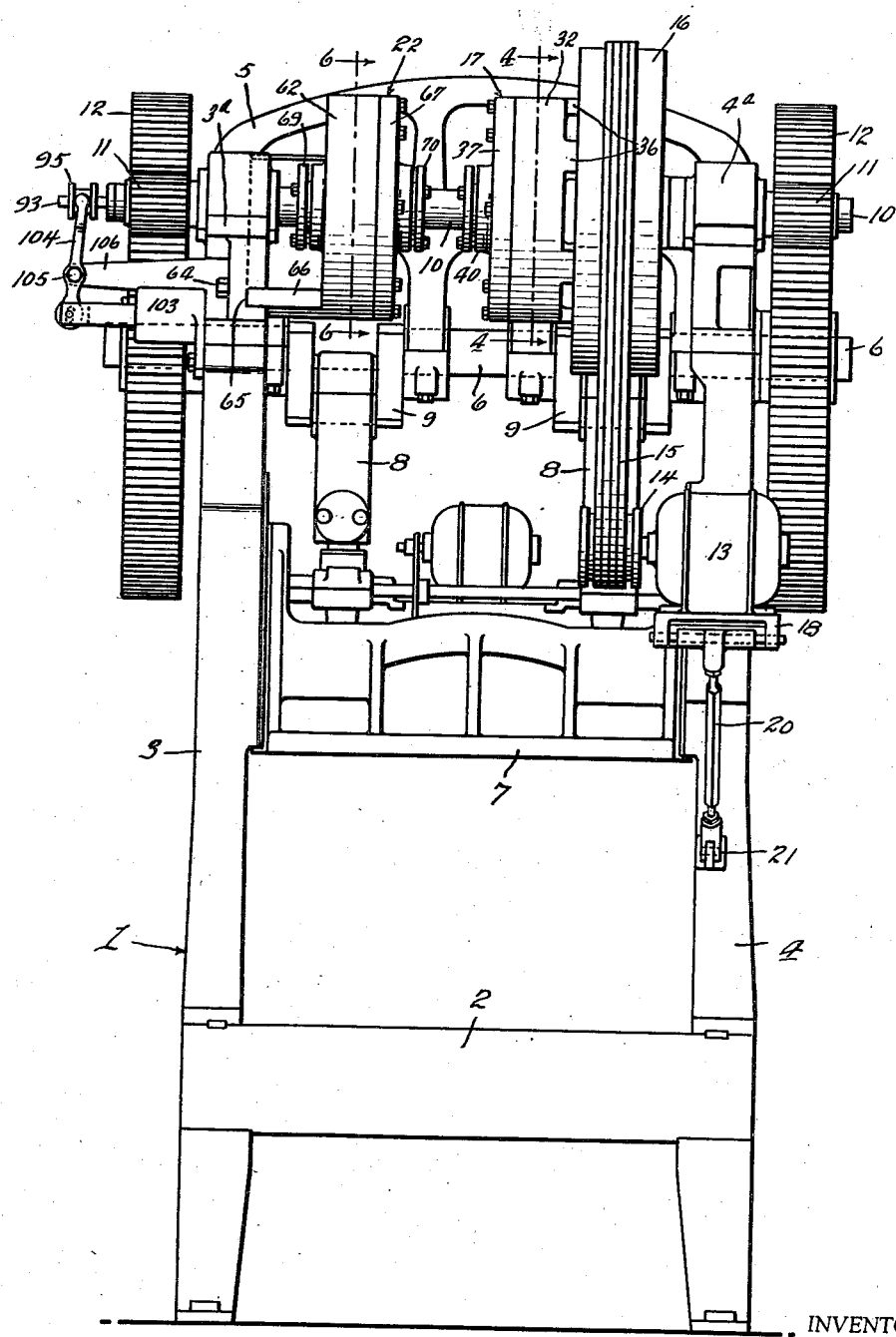

Aug. 15, 1939.   R. B. TREER   2,169,747
POWER PRESS
Filed Feb. 23, 1937   5 Sheets-Sheet 1

INVENTOR.
Ross B. Treer
BY
ATTORNEY.

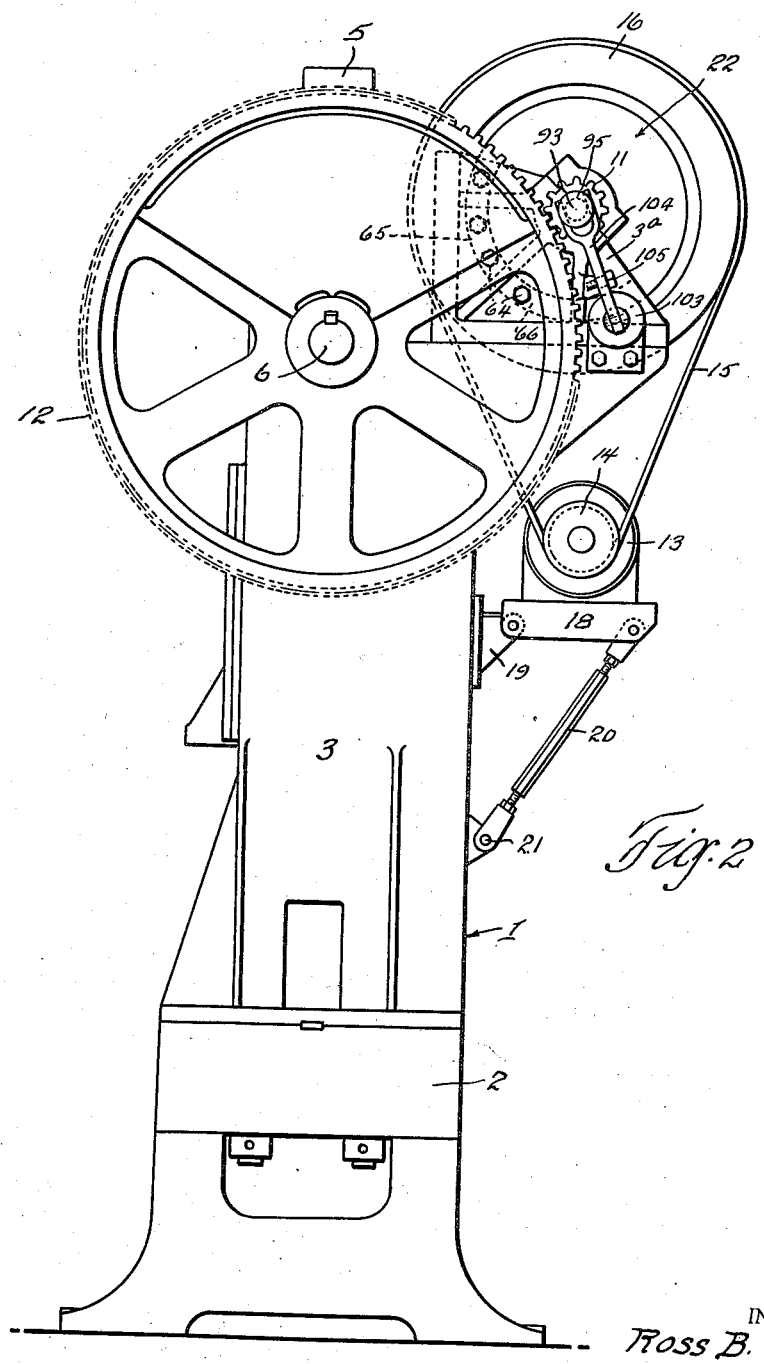

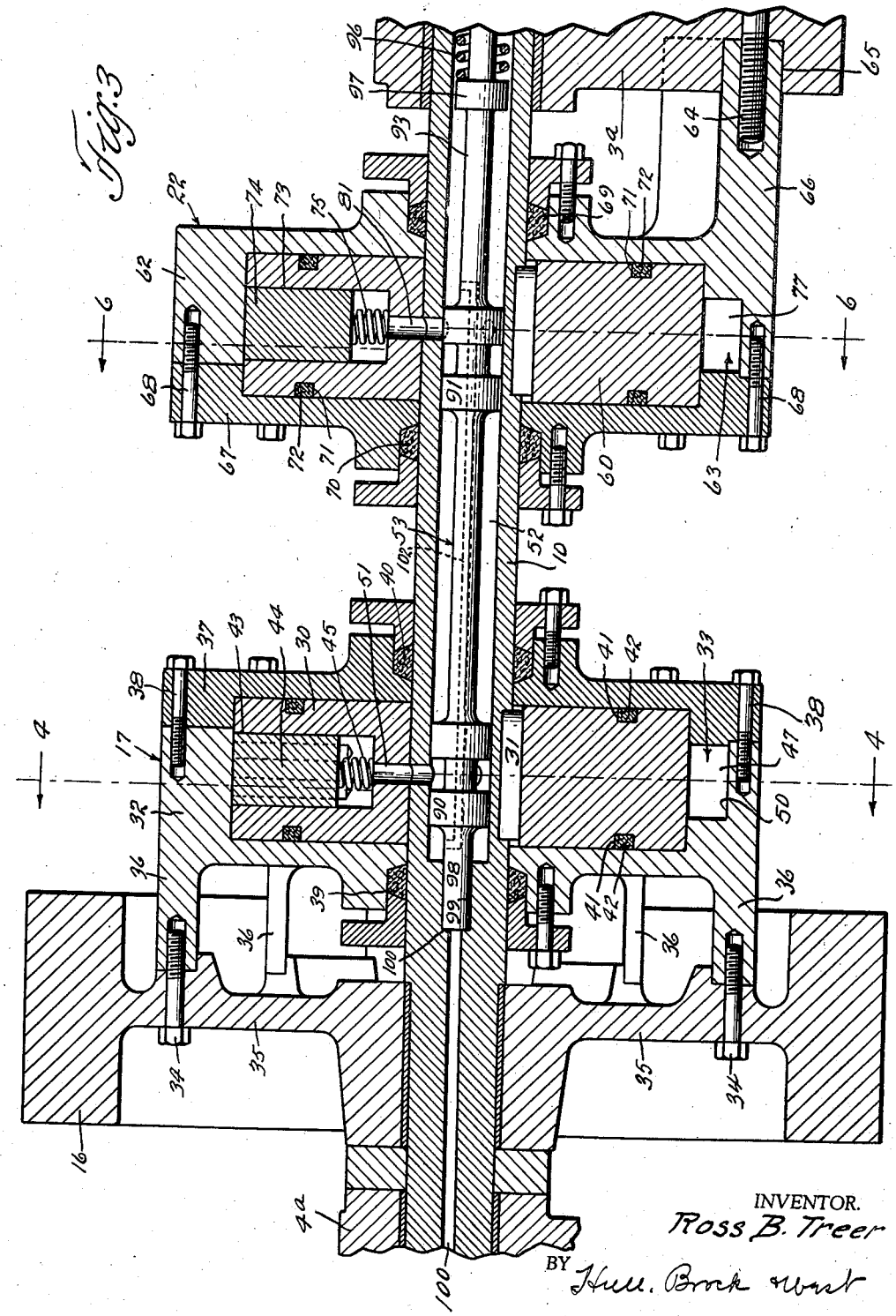

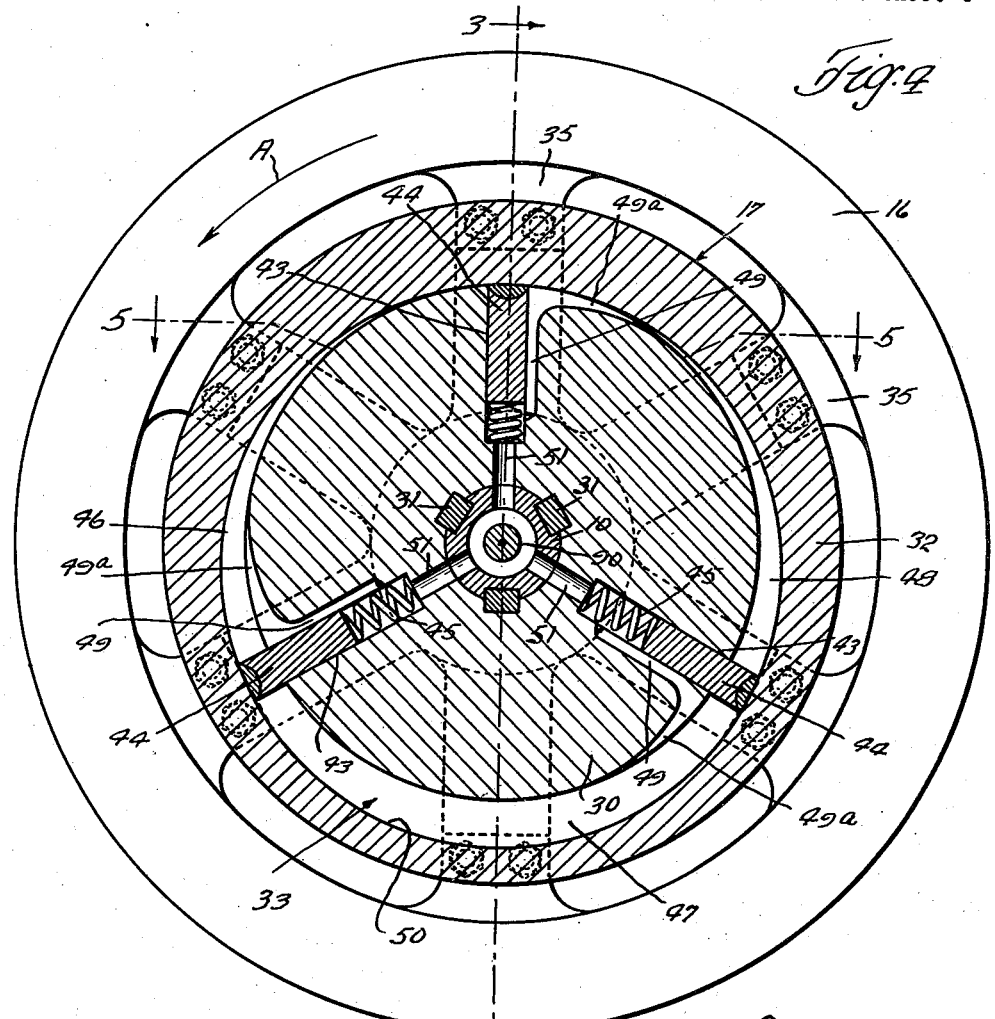
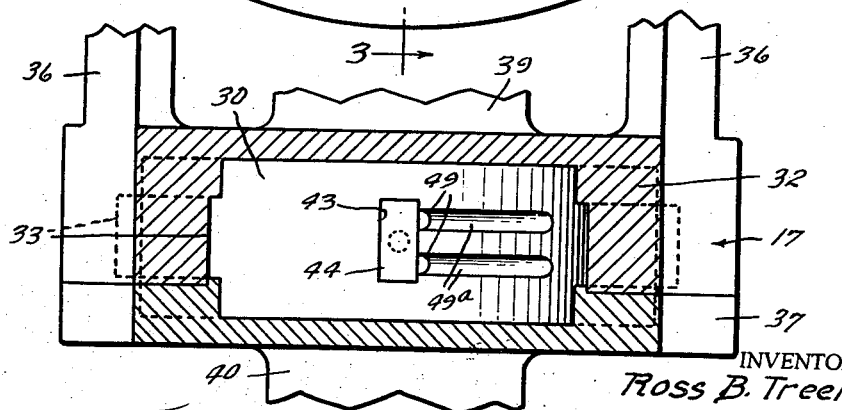

Aug. 15, 1939.　　　R. B. TREER　　　2,169,747
POWER PRESS
Filed Feb. 23, 1937　　　5 Sheets-Sheet 5
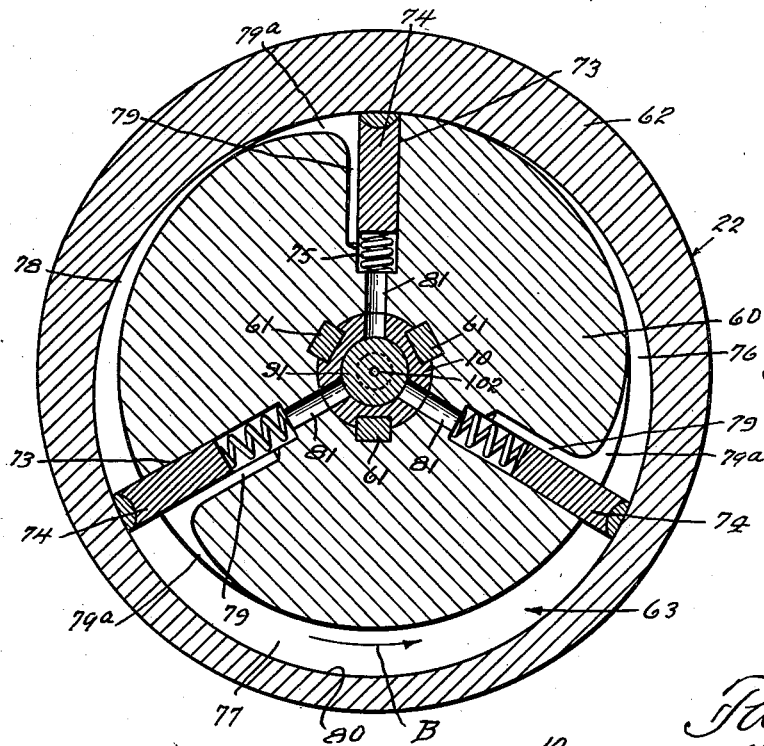
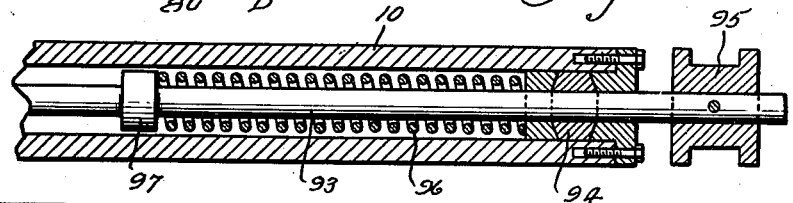
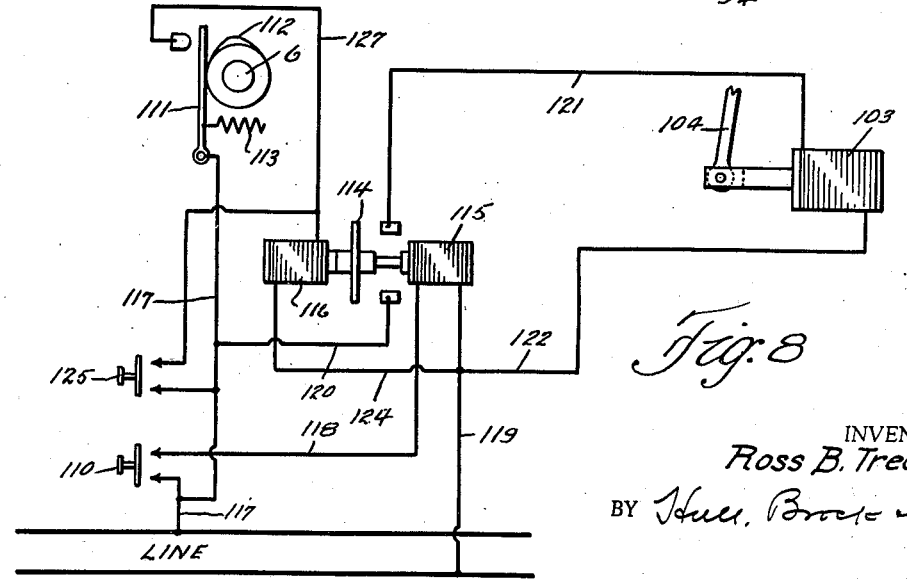
INVENTOR.
Ross B. Treer
BY
ATTORNEY.

Patented Aug. 15, 1939

2,169,747

UNITED STATES PATENT OFFICE 2,169,747

POWER PRESS

Ross B. Treer, Lakewood, Ohio, assignor to The Cleveland Punch & Shear Works Company, Cleveland, Ohio, a corporation of Ohio Application February 23, 1937, Serial No. 127,183

3 Claims. (Cl. 192—144)

This invention relates generally to power presses and kindred apparatus, and more particularly to means for controlling the operation thereof.

An object of the invention is to provide in a mechanism of this character, a clutch and a brake, both of which are self contained and self energizing, together with means for operating them in timed relation to each other at predetermined points in the cycle of operation of the apparatus to which they are applied.

Another object of the invention is to provide, in a power transmission and control device, a clutch and a brake, both of which are so constructed that they will automatically take up for wear due to long or continued use and will, due to this automatic take up, always exert the same clutching and braking action throughout their life.

Another object of the invention is to provide a clutch and a brake, for power presses and the like, which will operate quietly and easily, without grabbing, and yet will be positive in their operation.

Another object of the invention is the provision, in apparatus of this character, of a hydraulic clutch and a hydraulic brake, together with novel and efficient interconnecting apparatus for operating them in timed relation to each other.

Another object of the invention is the provision, in a hydraulic clutch or brake having a plurality of expansible fluid chambers, of simple, novel and efficient means for controlling the flow of fluid between the chamber thereof and thus controlling the operation of the clutch or brake.

Other and more limited objects of the invention will be apparent from the following specification and the accompanying drawings forming a part thereof wherein Fig. 1 is a rear elevation of a power press showing my invention applied thereto; Fig. 2 is an end elevation thereof looking from the left of Fig. 1; Fig. 3 is a longitudinal section through a portion of the power shaft and the clutch and brake carried thereby; Fig. 4 is a transverse section through the clutching unit taken on a plane indicated by the lines 4—4 of Figs. 1 and 3; Fig. 5 is a horizontal section taken on the line 5—5 of Fig. 4; Fig. 6 is a transverse section through the brake taken on the lines 6—6 of Figs. 1 and 3; Fig. 7 is a longitudinal section through the left hand end of the power shaft as viewed in Fig. 1, and constitutes the balance of the power shaft extending to the right of Fig. 3; and Fig. 7 is a diagram of one form of control mechanism which may be used for automatically operating the clutch and brake at predetermined times in the cycle of operation of the press.

Referring now to the drawings by reference characters, 1 indicates generally a power press of standard construction which consists of a base 2 having upwardly extending side frames 3 and 4 which are connected together at their upper ends by a crown 5. A crankshaft 6 is rotatably mounted at the upper end of the side frames 3 and 4 adjacent the crown 5. A die carrying slide 7, slidably mounted between the frames 3 and 4, is reciprocated by the rotation of the crankshaft through connecting rods 8 which have their lower ends connected to the slide 7 and their upper ends connected to the cranks 9 of the crankshaft 6.

The crankshaft 6 is rotated by a power shaft 10, rotatably supported by bearings in bearing brackets 3ᵃ and 4ᵃ secured to the side frames 3 and 4, respectively. The power shaft 10 is connected to the crankshaft by small gears 11, one on each end of the power shaft, meshing with large gears 12 keyed to the ends of the crankshaft.

The power shaft 10 is in turn rotated by a motor 13, through means of a pulley 14, belt 15, flywheel 16 and clutch 17—the pulley 14 being secured to the armature shaft of the motor 13, the flywheel 16 being rotatably mounted on the shaft 10, the clutch 17 providing a driving connection between the flywheel 16 and power shaft 10 and the belt 15 forming a driving connection between the pulley 14 and flywheel 16.

The motor 13 is carried by a support 18 which has one end pivotally connected to a bracket 19, on the side frame 4 of the press, and its other end connected to the upper end of an adjustable link 20 which has its lower end pivotally connected to the press frame at 21. The tension of the belt 15 is adjusted by the link 20.

A braking mechanism, generally indicated by the numeral 22, having one part thereof keyed to the power shaft 10 and another part thereof rigidly secured to the bearing bracket 3ᵃ, is operated in timed relation with the clutch 17, as will be described in detail hereinafter, to stop the crankshaft 6 at a predetermined point—generally when the cranks 9 thereof are on upper dead center.

The clutch unit generaly indicated at 17, comprises an inner member or hub 30, keyed to the power shaft 10, as indicated at 31, and an outer member or casing 32 enclosing the inner member or hub 30, and providing therebetween an eccentric fluid containing interspace, generally indicated at 33.

The clutching unit 17 is mounted adjacent the flywheel 16, which is as hereinbefore stated rotatably mounted on the power shaft 10, and is rigidly connected thereto, and rotatable therewith, by bolts 34 extending through the spokes 35 of the flywheel and into bosses 36 extending outwardly towards the flywheel from the casing 32, and forming a part thereof. The numeral 37 indicates a closure plate secured to the casing 32 by bolts 38, and forming a part thereof. Packing glands, of any suitable form, between the casing 32 and the power shaft 10, and between the closure plate 37 and the power shaft 10, are indicated by 39 and 40, respectively. Grooves 41 in each side of the hub 30, filled with any suitable packing material 42, provide additional means for preventing leakage of fluid from the eccentric interspace 33.

The hub 30 has a plurality of radially extending bores 43 therein in which are slidably mounted blades 44, urged outwardly by springs 45 bearing against the inner faces thereof, which divide the eccentric fluid containing interspace 33 into a plurality of expansible fluid chambers 46, 47 and 48.

Fluid passageways 49, form a fluid connection between the inner end of each of the bores 43 and one of the fluid chambers adjacent thereto. The outer ends of the passageways 49 extend circumferentially of the hub 30, for a short distance as indicated at 49ª. As the flywheel and consequently the casing 32 which is rigidly connected thereto is rotated, in the direction of the arrow A, Fig. 4, the chamber 46 will be a high pressure chamber and the chambers 47 and 48 will be low pressure chambers, provided of course that the fluid control mechanism for these chambers, to be described hereinafter, is properly set. As the chambers 47 and 48 assume the position of the chamber 46 in Fig. 4, they in turn will become high pressure chambers, and the other chambers will become low pressure chambers. The passageways 49, 49ª are so arranged with respect to each blade 44 that they will always form a communication between the inner face of the blades 44 and the adjacent chamber which is, when they are in the position shown in Fig. 4, a high pressure chamber. This construction and arrangement of the various parts provides automatic means, which are self energized by the operation of the clutch, for forcing the blades 44 outwardly against the inner face 50 of the eccentric interspace 33, at the proper time in the operation thereof, to effectively seal the fluid in the high pressure chamber.

Bores 51, in combination with the passageways 49, 49ª, provide a communication between each of the chambers 46, 47 and 48 and a chamber 52 formed within the power shaft 10, and thus form a fluid connection between all of the chambers 46, 47 and 48 and each other. Means generally indicated at 53, to be described hereinafter, is provided in the chamber 52 for controlling the flow of fluid between each of the chambers 46, 47 and 48 and the chamber 52 and thus control the flow of fluid between the various chambers 46, 47 and 48.

If the flywheel 16 and the casing 32 rigidly connected thereto are rotated in the direction of the arrow A in Fig. 4, and the mechanism 53 is in a position to prevent the flow of fluid between the chambers 46, 47 and 48 through the chamber 52, the hub 30 and consequently the power shaft 10 will rotate with the flywheel. If however the mechanism 53 is in a position to permit the free flow of fluid between the chambers 46, 47 and 48 through the chamber 52, the hub 30 and power shaft 10 will remain stationary and the flywheel will rotate freely on the shaft 10.

The braking unit, generally indicated at 22, comprises a hub 60 similar to the hub 30, keyed to the shaft 10 in spaced relation thereto as indicated at 61; and an out member or casing 62, enclosing the inner member or hub 60, and providing therebetween an eccentric interspace 63.

The braking unit 22 is mounted adjacent the bearing bracket 3ª, and the casing 62 thereof is rigidly secured to the bracket 3ª by bolts 64 passing through the bracket 3ª and into a circumferential boss 66 extending outwardly from the casing 62 and into a groove 65 in the bracket 3ª. The numeral 67 indicates a closure plate secured to the casing 62 by bolts 68, and forming a part thereof. Packing glands, similar to the packing glands 39 and 40, between the power shaft 10 and the casing 62, and between the closure plate 67 and the shaft 10, are indicated at 69 and 70, respectively. Grooves 71, similar to the grooves 41, in each side of the hub 60, filled with packing material 72, similar to the packing material 42, provide means additional to the packing glands 69 and 70 for preventing leakage of fluid from the eccentric interspace 63.

The hub 60 has a plurality of radially extending bores 73, similar to the bores 43, therein in which are slidably mounted blades 74, similar to the blades 44, urged outwardly by springs 75 bearing against the inner ends thereof, which divide the eccentric fluid containing interspace 63 into a plurality of expansible fluid chambers 76, 77 and 78.

Fluid passageways 79, 79ª, similar to the passageways 49, 49ª, in the hub 60, provide automatic, self energizing means for urging the blades 74 outwardly into engagement with the face 80 of the eccentric interspace 63, for preventing the escape of fluid from the high pressure chamber adjacent thereto. As the hub 60 is rotated in the direction of the arrow B, Fig. 6, the chamber 76 will be a high pressure chamber tending, through the medium of the fluid trapped therein, to resist the rotation of the hub 60; and the chambers 77 and 78 will be low pressure chambers, provided that the fluid control mechanism for these chambers, to be described hereinafter in combination with the fluid control mechanism for the chambers 46, 47 and 48, is properly set. As the chambers 77 and 78 assume the position of the chamber 76 in Fig. 6, they in turn will become high pressure chambers and the other chambers will become low pressure chambers.

Bores 81, in combination with the passageways 79, 79ª provide a fluid connection between each of the chambers 76, 77 and 78 and the chamber 52 in the power shaft 10, and thus form fluid connections between all of the chambers 76, 77 and 78 and each other. The mechanism 53, in the chamber 52, referred to hereinbefore in connection with the description of the clutching unit 17, also controls the flow of fluid between each of the chambers 76, 77 and 78 and the chamber 52 and thus controls the flow of fluid between the various chambers 76, 77 and 78.

When the mechanism 53 is in a position to prevent the flow of fluid between the chambers 76, 77 and 78, the hub 60 and consequently the power shaft 10 to which the hub 60 is keyed will be held stationary with respect to the casing 62; and when the mechanism 53 is in a position to permit the free flow of fluid between the chambers 76, 77 and 78, the hub 60 and shaft 10, will rotate freely with respect to the casing 62.

The fluid used in the fluid chambers 46, 47 and 48 in the clutching unit 17, and the fluid chambers 76, 77 and 78 in the braking unit, is preferably highly incompressible oil, the viscosity of which remains substantially constant regardless of temperature.

The mechanism 53 forms a connection between the clutching unit 17 and the braking unit 22 and is so constructed and arranged with respect to the clutching unit 17 and braking unit 22 that the clutch and brake are operated in timed relation to each other when this mechanism is operated.

This mechanism 53 will now be described. It consists of a pair of valves 90 and 91, slidably mounted in the chamber or bore 52 in the power shaft 10, connected together by a valve stem 92. A long valve stem 93, connected to the valve 91, extends out through a packing gland 94 in the right hand end of the shaft 10, as shown in Figs. 3 and 7, and has a grooved collar 95 pinned to the end thereof. A spring 96, surrounding the valve stem 93 and having one end bearing against the inner end of the packing gland 94 and the other end bearing against a collar 97 rigidly secured to the valve stem 93, normally holds the valves 90 and 91 in the position shown in Fig. 3. A short valve stem 98 of the same diameter as the valve stem 93, extending to the left of the valve 90 (Fig. 3) and into a bore 99 forming a reduced extension of the chamber 52, limits the movement of the valves 90 and 91 to the left (Fig. 3), by engagement with a shoulder 100, formed at the junction of the bore 99 and a small breather bore 101 extending out through the left hand end of the shaft 10. The chamber 52 is filled with fluid, preferably oil, and serves, through the mechanism of a restricted passageway 102, forming a communication between that part of the chamber 52 at the left of the valve 90, and that part of the chamber 52 at the right of the valve 91, to prevent too rapid a movement of the valves 90 and 91 in either direction. It will be apparent that the speed of movement of the valves 90 and 91 can be varied by changing the size of the passageway 102.

The valves 90 and 91 are moved in the opposite direction (to the right, Fig. 3) by a solenoid 103. The solenoid, 103 is operatively connected to one end of a link 104, pivoted at 105 to one arm 106 on the press frame 3. The other end of the arm 104 is bifurcated and operatively engages the collar 95 on the end of the valve stem 93.

The valve 90 controls the flow of fluid between the fluid chambers 46, 47 and 48 and thus controls the operation of the clutch 17, and the valve 91 controls the flow of fluid between the fluid chambers 76, 77 and 78 of the brake 22, and in a like manner controls the operation of the brake. The rotation of the power shaft 10, by the flywheel 16, is entirely dependent upon how much the flow of fluid between the chambers 46, 47 and 48 is restricted. If the valve 90 is positioned, as in Fig. 3, to allow the fluid to flow freely between the chambers 46, 47 and 48, the shaft 10 will remain stationary and the flywheel will rotate freely thereon. If however, the valve 90 is positioned to entirely stop the flow of fluid between the chambers 46, 47 and 48, the shaft 10 will rotate with the flywheel and at the same speed. Any position of the valve 90 between these two extremes will cause the shaft 10 to rotate, but at a lesser speed than the flywheel; the relative rotation between the shaft 10 and the flywheel 16 being dependent on the position of the valve 90 with respect to the passageways 51, forming with the passageways 49, 49a the connection between the chambers 46, 47 and 48. The braking action exerted by the braking unit 22 on the shaft 10, is in a like manner entirely dependent upon the position of the valve 91.

The position of the valves 90 and 91 in Figs. 3, 4 and 6, is such that the clutch 17 is entirely disengaged, and the brake 22 is entirely applied. In the construction shown, the valves 90 and 91 are so arranged with respect to the clutch unit 17 and the braking unit 22 and to each other, that movement thereof will engage the clutch and disengage the brake at the same rate; and vice versa. It is to be understood however that if desired, the valves 90 and 91 may be so arranged that the brake will be entirely disengaged before the clutch starts to engage, when starting the press, and that the clutch will be entirely disengaged before the brake starts to act, when stopping the press.

In Fig. 8, I have illustrated diagramatically one form of control mechanism which may be used for operating the solenoid 103, and consequently the clutch 17 and brake 22 at predetermined times in the cycle of press operations. It consists of a push button switch 110, an automatically operative switch 111 that is closed by a cam 112, secured to the crankshaft 6 in any suitable manner and opened by a spring 113; and a switch 114 which is closed by a solenoid 115 when the push button switch 110 is operated, and opened by a solenoid 116 when the switch 111 is closed by the cam 112.

The operation of the press will now be described, it being understood that the motor 13 through the pulley 14 and belt 15 drives the flywheel 16 continuously. To start the press, the operator closes the push button switch 110 which will energize the solenoid 115 through the lines 117, 118 and 119. This will close the switch 114 and energize the solenoid 103 through the lines 117, 120, 121, 122 and 119. The solenoid 103 will, through the link 104 and valve stem 93, operate the valves 90 and 91 to release the brake 22 and engage the clutch 17. The crankshaft 6 will then be rotated by the power shaft 10 through the gears 11 and 12. After the crankshaft has been rotated a predetermined amount, the cam 112 will close the switch 111 which will energize the solenoid 116 through the lines 117, 123, 124 and 119. This will open the switch 114 and break the circuit to the solenoid 103. The spring 96 will then operate the valves 90 and 91 to release the clutch 17 and apply the brake 22, to stop the rotation of the crankshaft 6. The inertia of the crankshaft 6, and the various connected parts, is such that, after the circuit to the solenoid 103 has been broken, it will continue to rotate until the cam 112 moves to a position to allow the spring 113 to open the switch 111. The mechanism is then in position for the next operation. A manually operated switch 125 is provided for energizing the solenoid 116 to break the circuit to the solenoid 103, in case it should be necessary at any time to stop the press before it has completed its regular cycle.

It is to be understood that I do not intend to restrict my invention to the specific construction and application shown and described herein, as various modifications and applications thereof are possible within the scope of the appended claims.

Having thus described my invention, what I claim is:

1. In a device of the character described, the combination of a frame, a shaft rotatably supported by said frame, an inner body rigidly secured to said shaft, a rotatable outer body surrounding said inner body and providing an eccentric interspace therebetween, means carried by one of said bodies dividing said eccentric interspace into compartments, fluid in said compartments, a passageway connecting said compartments, a valve in said passageway, a second inner body member rigidly secured to said shaft in spaced relation to said first mentioned inner body member, a stationary outer body member, rigidly secured to said frame, surrounding said second inner body member and providing an eccentric interspace therebetween, means dividing said second mentioned interspace into compartments, fluid in said compartments, a passageway connecting said second mentioned compartments, a valve in said second mentioned passageway, means for simultaneously operating said valves to restrict the flow of fluid through one of said passageways and to increase the flow of fluid through the other of said passageways, and means for rotating said rotatable outer body member.

2. In a device of the character described, the combination of a frame, a plunger slidably mounted in said frame, a crankshaft rotatably supported by said frame and operative connections between said plunger and said crankshaft, means for controlling the rotation of said crankshaft comprising a power shaft, driving connections between said power shaft and said crankshaft, a clutching unit and a braking unit on said power shaft in spaced relation to each other, said clutching unit and said braking unit each comprising inner and outer members providing a plurality of eccentric fluid chambers therebetween, the inner body of said clutching unit and the inner body of said braking unit being rigidly secured to said power shaft, and fluid connections between the chambers of each unit; means for rotating the outer member of said clutching unit, means rigidly securing the outer member of said braking unit to the frame and interconnected means for simultaneously decreasing the flow of fluid between the compartments of one of said units and increasing the flow of fluid between the compartments of the other of said units.

3. In a combined clutch and brake, the combination of a shaft, a chamber in said shaft, a pair of hubs keyed to said shaft in spaced relation to each other, a rotatable casing surrounding one of said hubs and providing an eccentric interspace therebetween, means dividing said interspace into a plurality of fluid compartments, a passageway between each of said compartments and said chamber, a stationary casing surrounding the other of said hubs and providing an eccentric interspace therebetween, means dividing said second mentioned interspace into a plurality of fluid compartments, a passageway between each of said second mentioned compartments and said chamber, a pair of valves in said chamber, one of said valves controlling the flow of fluid between the first mentioned compartments and the other of said valves controlling the flow of fluid between said second mentioned compartments, means for simultaneously operating said valves to cause the associated hub to revolve with the rotatable casing and the other of said hubs to revolve with respect to the stationary casing, and means for rotating said rotatable casing.

ROSS B. TREER.